W. W. Cleareland,
Turning Regular Forms,
No. 82,600. Patented Sep. 29, 1868.

Witnesses:
Jermo F. Johnson
Elphonzo Younge

Inventor:
Wallace W. Cleavland
By J. B. Woodm[f]ason
Att'ys

United States Patent Office.

WALLACE W. CLEAVELAND, OF COLDWATER, MICHIGAN.

*Letters Patent No. 82,600, dated September 29, 1868.*

IMPROVEMENT IN TURNING WAGON-HUBS.

*The Schedule referred to in these Letters Patent and making part of the same.*

TO ALL WHOM IT MAY CONCERN:

Be it known that I, WALLACE W. CLEAVELAND, in the city of Coldwater, Branch county, in the State of Michigan, have invented certain new and useful Improvements in a Machine for Turning, Shaping, and Gauging Wagon-Hubs for all kinds of wheeled vehicles; and the following is a full, clear, and exact description of the same, reference being had to the accompanying drawings, making a part of this specification, in which—

Figure 1:
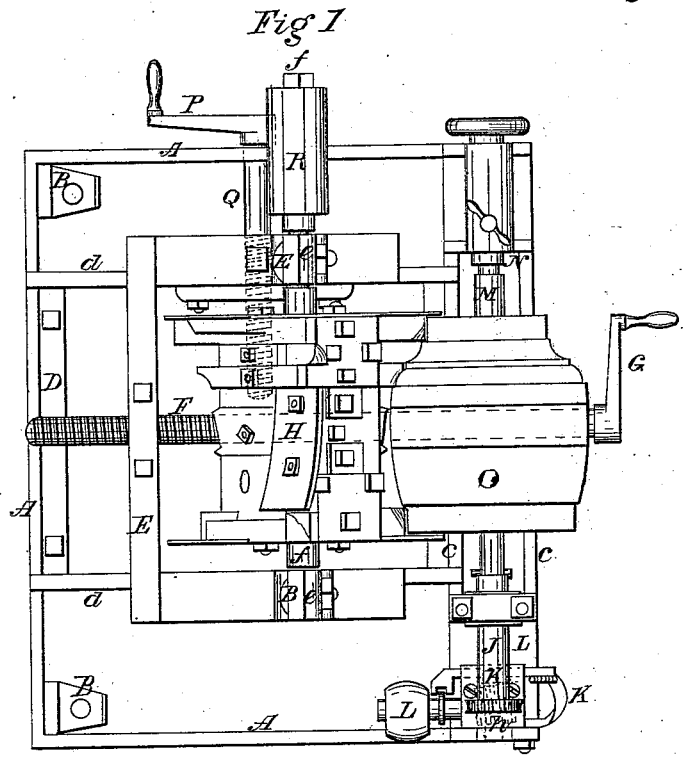
Figure 1 represents a plan or top view of the machine.
Figure 2:
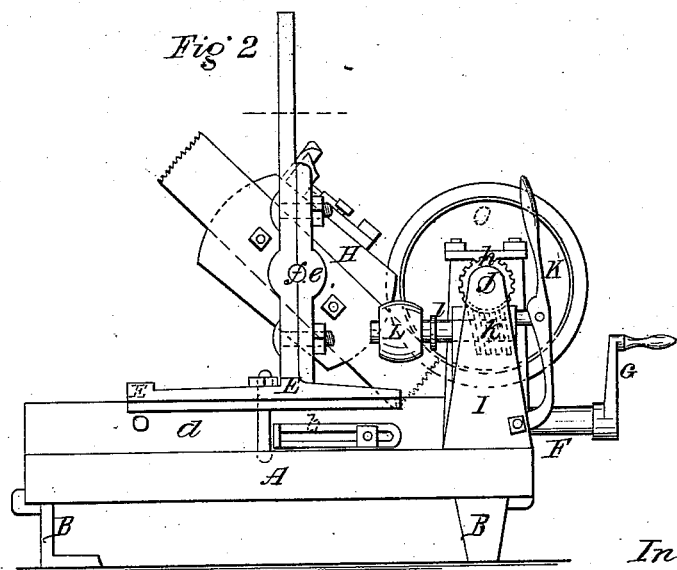
Figure 2 shows an end elevation of the same.

The object of my invention is to make hubs, for all wheeled vehicles, of more uniform shape and size, and much faster than they can be turned in a lathe, as they have heretofore been done.

My invention consists in the construction, arrangement, and combination of the revolving cutter-head, the adjustable sliding frames, and the lathe.

To enable others to make and use my improved hub-making machine, I will proceed to describe it more in detail, referring to the drawings, and to the letters marked thereon.

I make a strong frame, A A, of metal, or other suitable material, with feet or straps, B B, for securing it to the bench. On the top of the frame A A, extending crossways from the back, A', to the lathe-shears C C, I secure another frame, D, with elevated ways, $d\,d$, on which the elevated frame E slides forward and back by the action of the screw F, turned by the crank-handle G in front of the machine.

The uprights of the frame E are provided with journal-boxes, $e\,e$, in which the shaft $f$ is hung, on which the revolving cutter-head H is secured; the same being provided with a double series of adjustable blades, bits, and saws, so arranged and adjusted as to reduce the wood, and give the required length, shape, and size of the hub, the various sizes being determined by a scale or stop, $b$, on the way $d$.

The front of the machine is made like an ordinary lathe, with head I and mandrel J, on which is a spiral cog-wheel, $h$, turned by a worm-pinion, $k$, on the shaft $l$, by the pulley L, which has a clutch, operated by the hand-lever K, to start or stop the revolving mandrel J, to which the mandrel M connects, on which the hub O is driven to be turned or shaped. The other end of the mandrel M is held by a pivot in the tail-screw N, the same as any ordinary lathe.

The blocks being cut a suitable length, and bored through, (the size of the mandrel M, which is driven in,) they are then placed in the lathe, the cutter-head adjusted to the proper place by the crank-handle P and screw Q, the cutters put in motion by a belt on the long pulley R, on the end of the shaft $f$. It is then brought up to the stop $b$, cutting its way into the block, when the block is set slowly revolving by a belt on the pulley L, and turned once round, and the hub O is completed.

By a machine constructed to operate as above described, at least four hubs can be made and completed, exactly the same form and size, while one can be turned by the most skilful turner, and no skill is necessary further than to put the blocks in the lathe and adjust to it, and start the machine.

I do not claim, broadly, revolving cutters for reducing or shaping turned work, as that device is old and common property; but What I do claim as my invention, and desire to secure by Letters Patent, is—

The arrangement of the revolving cutter-head, carried in the lateral and longitudinal-moving frame, with the fixed arbor for revolving the block of which the hub is made, all as herein described.

WALLACE W. CLEAVELAND.

Witnesses:
D. N. GREEN,
GEO. C. GREEN.